United States Patent [19]

Hengst

[11] 4,087,153
[45] May 2, 1978

[54] BINOCULARS WITH DOUBLE HINGE BRIDGE AND RESILIENT BIASING

[75] Inventor: Alfred Hengst, Wetzlar-Dorlar, Germany

[73] Assignee: Ernst Leitz GmbH, Wetzlar, Germany

[21] Appl. No.: 571,980

[22] Filed: Apr. 28, 1975

[30] Foreign Application Priority Data

May 22, 1974 Germany .............................. 2424792

[51] Int. Cl.² .......................... G02B 7/06; G02B 23/00
[52] U.S. Cl. ......................................... 350/76; 350/36
[58] Field of Search .................................. 350/74–77, 350/70, 36

[56] References Cited

U.S. PATENT DOCUMENTS

| 539,006 | 5/1895 | Murphy et al. ......................... 350/74 |
| 1,428,478 | 9/1922 | Dunne ................................ 350/75 X |
| 2,534,776 | 12/1950 | Kershaw et al. ...................... 350/77 |
| 2,901,942 | 9/1959 | Tackaberry ......................... 350/77 X |
| 3,484,149 | 12/1969 | Becker et al. .......................... 350/76 |
| 3,604,779 | 9/1971 | Reinhold ............................... 350/75 |

FOREIGN PATENT DOCUMENTS

| 2,233,055 | 1/1974 | Germany ............................... 350/76 |
| 2,316,955 | 10/1974 | Germany ............................... 350/76 |

Primary Examiner—Jon W. Henry
Attorney, Agent, or Firm—Ralf H. Siegemund

[57] ABSTRACT

The focussing elements in the telescopes of a pair of binoculars are shifted in unison by a transverse which rides threadedly on a central adjusting spindle and is biased against that spindle as well as against transfer rods which are coupled to the focussing elements.

10 Claims, 3 Drawing Figures

BINOCULARS WITH DOUBLE HINGE BRIDGE AND RESILIENT BIASING

BACKGROUND OF THE INVENTION

The present invention relates to binoculars with double hinge and central adjustment for focussing.

The German printed patent application No. 2,233,055 discloses binoculars of that type wherein the two telescopes are interconnected by a double hinge bridge. The parts for focussing are located inside of the telescope tubes and are adjusted by elements which are centrally located, outside of the tubes. The adjustment elements include a spindle and a nut riding thereon and moving in axial direction. A connecting element extends from the nut towards the two tubes for connection to the focussing elements therein.

This known arrangement permits focussing of the two telescopes in unison, but the transfer mechanism between the adjusting spindle and the focussing elements in the telescopes are disposed outside of the telescope tubes as well as outside of the connecting bridge for the two telescopes. Moreover, the nut and other focussing elements require a certain amount of space for movement so that these parts must be sufficiently spaced from the bridge to permit that movement. Consequently, the transfer elements linking the nut with the focussing elements are exposed to damage, and to ambient weather conditions. It can readily be seen that any of these conditions may interfere with proper operation of the focussing mechanism. Also, all exposed parts must have undergone rather expensive surface treatment and finishing.

DESCRIPTION OF THE INVENTION

It is an object of the present invention to provide for a new and improved focussing drive for binoculars, particularly involving the connecting structure between a central adjustment mechanism and the optical focussing parts in the binoculars.

It is another object of the present invention to provide for transmission of adjustment from a central, usually rather short spindle to the relatively far away focussing elements in the telescope tubes of binoculars, without any play or backlash.

It is another object of the present invention to provide for a binocular construction of compact design with as little exposure of movable parts as possible.

In accordance with the preferred embodiment of the invention, binoculars are improved having a pair of telescope tubes interconnected by a bridge in double hinge fashion and wherein the bridge contains a central spindle while each tube is associated with a transfer rod also contained in the bridge, for moving the respective focussing element. In accordance with the improvement of the present invention a transverse element also contained in the bridge is driven by the spindle and spring-elastically held in engagement therewith; the transverse element is drivingly connected to the transfer rods for moving them to obtain focussing adjustment in the tubes. The transverse element itself is preferably of spring-elastic construction so as to avoid backlash and play as between it and the spindle. Specifically, the transverse element is placed in resilient biasing disposition as between the spindle and the transfer rods whereby the ends of the transverse element are constructed as followers bearing against (but not being fastened to) recesses, edges or the like in the transfer rods.

The transverse element may be mounted to a nut which is threadedly traversed by the spindle in worm gear fashion. Alternatively, the central portion of the transverse element may be constructed as threaded segment which is preferably interrupted in axial as well as in transverse directions, preferably in the middle portion thereof, so that V-shaped areas of engagement with the spindle are established which indeed avoid play and backlash.

It is another feature of the invention that the transverse element has a support yoke, having disposition opposite to the threaded segment (the spindle is located inbetween) to prevent slippage between the spindle and the threaded segment when in end position but upon continued manipulation of the spindle.

A compact construction is attained by disposing each of the transfer rods inbetween hinge parts as extending from the telescope tubes, whereby, however, one end of each rod extends into one hinge part of the respective tube. That hinge part is hollow to be traversed by linkage or the like for coupling the transfer rod to the focussing element proper in the respective tubes.

DESCRIPTION OF THE DRAWINGS

While the specification concludes with claims particularly pointing out and distinctly claiming the subject matter which is regarded as the invention, it is believed that the invention, the objects and features of the invention and further objects, features and advantages thereof will be better understood from the following description taken in connection with the accompanying drawings in which:

Figure 1:
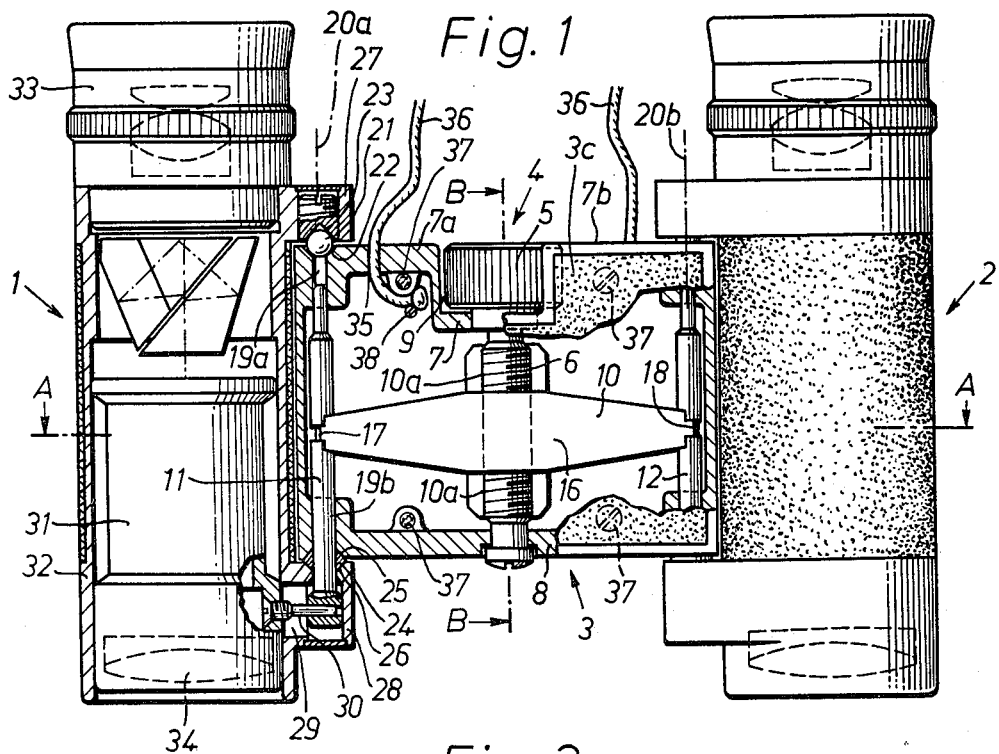
FIG. 1 is a side elevation, shown partially in broken open view, of a pair of two hinge binoculars.

Proceeding now to the detailed description of the drawings, the Figures show a pair of binoculars with two telescope tubes 1 and 2. Each telescope tube has a main sleeve 32, an eye piece 33 and an objective lens or lens system 34. A focussing element 31 is included in the sleeve and provided for axial displacement so as to obtain focussing. These parts are shown in detail for telescope tube 1 only, telescope tube 2 is analogously constructed.

The two tubes 1 and 2 are interconnected by means of a bridge 3. Specifically, each tube has hinge structure by means of which the bridge 3 is hinged therewith to the two tubes. The hinge structure will be described more fully below.

The bridge 3 is hollow and closed by means of a cover 3c, whereby particularly screws 37 are inserted to fasten cover 3c to the hollow bridge body. The central drive and adjustment of the binoculars is located inside of bridge 3, only knob 5 is directly accessible from the outside. The knob 5 sits on a spindle 6 which is journalled to the two rear and front end plates 7 and 8 of the bridge 3. The rear plate 7 has a recess 9 which receives knob 5. The depth of the recess corresponds to the axial dimensions of knob 5 so that the one end thereof is flush with the remaining portions 7a and 7b of plate 7. The cover 3c is also recessed so that knob 5 projects peripherally slightly above the outer surface of cover 3c for permitting manipulation.

A transverse 10 engages spindle 6 in that a threaded segment 10a of transverse 10 is threadedly received and held by the spindle threads. Upon turning of the spindle, transverse 10 moves (in FIG. 1) up or down. The segment 10a is centrally interrupted as to its axial extension as indicated by 13 to ensure engagement without tipping. The threaded interior of segment 10a has additionally an axial, central groove 15, extending for the axial length of the segment 10a and by means of which one obtains a prism like or V-shaped engagement with the spindle which is beneficial for reducing play and ensures engagement between transverse and spindle.

A support yoke or connecting arch 16 of transverse 10 is provided on the side opposite from segment 10a. The support yoke 16 clears the threads of the spindle and serves as lock to prevent slippage between spindle 6 and threaded segment 10a if accidentally the adjustment tends to exceed either limit position of adjustment. The two ends of flat transverse element 10 are constructed as followers and bear against transfer rods 11, 12 respectively without being fastened thereto. Notches or grooves 17, 18 are provided in the rods 11, 12 and the two tips of transverse 10 are inserted.

The transverse 10 is springy elastic and biased to obtain engagement with rods 11, 12 without play. It can readily be seen, that the tips of transverse 10 engage the rods (in FIG. 2) from below while integral, threaded segment 10a engages the spindle from above. This way, one obtains resilient bias as to all engagements without fastening but by means of elastic reaction, and bias permits ready compensation of tolerances of the transverse 10 and of rods 11, 12 and others.

The rods 11, 12 are slidably mounted in bores such as bores 19a, 19b of bridge 3 for rod 11. These bores 19a and 19b are aligned along an axis 20a. The other side of bridge 3 is provided with similar bores for rod 12 and these bores as well as rod 12 itself are coaxial with the axis 20b. The axes 20a and 20b are respectively coaxial with the hinge axes by means of which bridge 3 is connected to the tubes 1 and 2. The hinge structure is comprised of the following components.

Bridge 3 is connected to the eye piece - portion of each tube 1, 2 by means of a ball 21 situated in calotta shaped recesses 22 (bridge) and 23 (tube), whereby specifically the recess 23 is provided in the hinge carrier 27 projecting from tube 1. As to the objective end of each tube, bridge 3 is connected thereto by means of an annulus 24 held in two bearings 25 (bridge) and 26 (tube) whereby specifically bearing 26 is provided in a hinge carrier 28 projecting also from tube 1. The hinge axis is 20a, which is the axis along which rod 11 can be displaced by transverse 10. The connections are shown in detail only for tube 1, but tube 2 is connected to the other end of the bridge 3 in symmetrically analogous fashion, whereby particularly axis 20b serves also as a hinge axis.

The transfer rods 11, 12 project the respective annulus (24 in the case of 11) and specifically rod 11 projects into an opening 29 of carrier 28 and is specifically connected to a linkage or coupling member 30. Coupling member 30 projects laterally from the focussing element 31 in tube 1. Focussing element 31 slides inside of the sleeve 32 which is actually the main part of tube 1 and carries the eye piece 33 as well as the objective lens or lens system 34. Thus, as transverse 10 moves (in FIG. 1) up or down, rod 11 transfers that movement to element 31 via coupling member 30.

Figure 2:
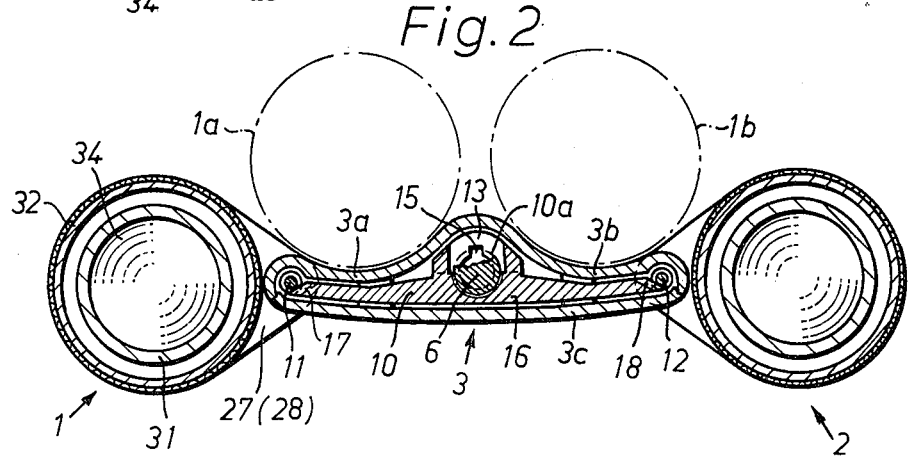
FIG. 2 is a cross-section along line A—A in FIG. 1.
Figure 3:
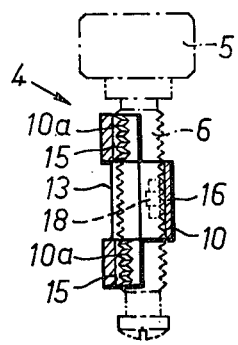
FIG. 3 is a longitudinal section view along line B—B of FIG. 1.

The folded-in position is depicted by dash dot lines in FIG. 2, wherein 1a and 1b represent the telescope tubes 1 and 2 respectively in that disposition. The side of the bridge 3 opposite to cover 3c has two identations 3a and 3b serving as bed to receive the tubes in this position of non-use.

The structure as described operates and is used as follows. For focussing, knob 5 is manipulated, i.e., turned to thereby turn spindle 6. The transverse arm 10 as biased against the spindle and as it is threadedly received, transverse 10 moves along the spindle axis. The ends of transverse element 10 as engaging the two rods 11, 12 will respectively slide in the bores such as 19a and 19b for rod 11. Thus, the rods 11 and 12 are shifted in parallel to their own axis. Since rods 11 and 12 are both coupled to the respective two focussing elements the latter are adjusted in unison. Since the rods 11 and 12 are coaxial with the hinge axes (20a, b) the binoculars can be focussed independently from the hinge position of the tubes 1 and 2 relative to the bridge.

As can be see best from FIG. 2, the axes of the tubes 1 and 2 are situated in a plane that has offset disposition from the spindle axis when the tubes have the folded-in position 1a, 1b. This way, the binoculars occupy small volume when not used.

A handle 36 is provided for carrying the binoculars. The handle is a rope or string connected as a loop in that it is passed through openings 35 adjacent to the upper small sides (7a, 7b) of the bridge 3. Each knot of the string forming the loop 36 is held between the upper fastening screws 37 for the cover 3c and bolts 38 which project into the interior of hollow bridge 3.

The invention is not limited to the embodiments described above but all changes and modifications thereof not constituting departures from the spirit and scope of the invention are intended to be included.

I claim:

1. Binoculars having a pair of telescope tubes, a bridge, double hinge means having two hinge axes and respectively connecting the bridge to the tubes of the pair, the bridge including a threaded spindle drive for focussing adjustment, the tubes of the pair each including optical focussing elements respectively operated by transfer means being in turn operated by the spindle drive, the improvement comprising:

the bridge being hollow and the transfer means including transfer rods extending parallel to the axis of the spindle drive, and being slidably disposed inside the bridge for respectively sliding on said hinge axes, said transfer rods extending from the bridge and constituting part of the hinge means;

the transfer means further including additional elements respectively extending transversely from the transfer rods into the tubes and being respectively connected to the transfer rods for being driven from the rods and further being coupled to the focussing elements respectively of the two tubes for causing the focussing elements to follow movement of the rods parallel thereto;

a single resilient transverse element disposed in the bridge and having a central part threadedly engaging and resiliently bearing against the threaded spindle drive for driving engagement therewith, the element having lateral ends extending transversely to and from the spindle drive and resiliently bearing against the transfer rods for tensionally coupling said transverse element and the transfer rods in the direction of the hinge axes and for causing a form closed connection between the central part of the transverse element and the threaded spindle drive thus eliminating play and blacklash in the threaded engagement of the spindle at the transverse element.

2. Binoculars as in claim 1, wherein the transverse element has two ends constructed as followers, the transfer rods have recesses respectively receiving the followers.

3. Binoculars as in claim 1, wherein the central part of the transverse element is constructed as a segmented threaded piece.

4. Binoculars as in claim 3, the threaded piece having an axial gap.

5. Binoculars as in claim 4, the threaded piece having a central groove.

6. Binoculars as in claim 3, wherein the transverse element has a yoke opposite the threads of the threaded piece.

7. Binoculars as in claim 1, wherein the rods are mounted in between hinge elements connecting the bridge to the tubes of the pair and along a pair of hinge axes.

8. Binoculars as in claim 7, wherein the rods are disposed in the bridge to move along the hinge axes.

9. Binoculars having a pair of telescope tubes, a bridge, double hinge means for connecting the bridge to the tubes, there being two hinge axes accordingly, a threaded spindle drive centrally disposed in the bridge, and an optical focussing element in each of the pair of tubes, the improvement comprising in combination:

the bridge being hollow and having internal bores aligned in pairs with the hinge axes; a pair of transfer rods slidably disposed in the hollow bridge on the hinge axes of said hinge means, said transfer rods each having its ends slidably disposed in the bores for axial movement on the hinge axes the one end each of each transfer rod extending through the respective bore and projecting from the bridge respectively into the tubes of the pair, thereby constituting a portion of the hinge means;

a resilient transverse element inside of the bridge and having a threaded central portion in resilient and threaded driving engagement with the spindle for axial movement upon turning of the spindle, the transverse element having two springly elastic outer arms each in resilient engagement with and resiliently bearing against said transfer rods for tensionally coupling said transverse element to the transfer rods, and for axially moving the transfer rods upon axial movement of the transverse element on the spindle, said coupling causing a form closed connection between said central portion and said spindle thus eliminating play and backlash in the threaded engagement of the spindle and the transverse element; and two separate means each respectively extending laterally from the respective projecting ends of the transfer rods to the focussing elements in the tubes for coupling these transfer rods, respectively to the focussing elements and causing the elements to follow movement of the rods parallel thereto.

10. Binoculars as in claim 9, said transfer rods having a central groove, said transverse element having tips engaging said grooves so that the rods can turn in relation to the transverse element disengagement upon folding the tubes against the bridge.

* * * * *